United States Patent [19]

Miller

[11] Patent Number: 4,949,983
[45] Date of Patent: Aug. 21, 1990

[54] MULTI PLANE ARTICULATING ROD SEAL
[75] Inventor: Robert J. Miller, Warren, Mich.
[73] Assignee: Colt Industries Inc., New York, N.Y.
[21] Appl. No.: 416,756
[22] Filed: Oct. 3, 1989
[51] Int. Cl.$^5$ .............................................. F16J 15/56
[52] U.S. Cl. .................................. 277/199; 277/192; 74/566
[58] Field of Search ............... 277/199, 192, 193, 194, 277/212 F, 104; 261/39.3; 74/566; 403/19 S, 197, 238, 243

[56] References Cited

U.S. PATENT DOCUMENTS

| | | | |
|---|---|---|---|
| 1,671,909 | 5/1928 | Struble | 277/199 |
| 2,726,885 | 12/1955 | Lucey | 277/104 |
| 2,765,184 | 10/1956 | Mackie | 74/566 |
| 4,575,098 | 3/1986 | Escue | 277/81 R |

Primary Examiner—William A. Cuchlinski, Jr.
Assistant Examiner—Daniel G. DePumpo
Attorney, Agent, or Firm—Howard S. Reiter

[57] ABSTRACT

A rod seal for establishing a seal between an elongate rod and a housing wall around an enlarged opening in the wall through which the rod projects provides a close fitting sliding seal between the rod and the seal to accommodate longitudinal reciprocation of the rod relative to the seal and housing and also provides a sliding seal between the seal and housing wall to accommodate lateral movement of the rod relative to the housing. The sleeve is of a two piece construction which is assembled by a snap fit after the rod has been inserted into one element of the seal so that an enlarged end of the rod may be passed through an opening in the one seal element and the subsequent assembly of the second element achieves a close sliding fit with the unenlarged diameter section of the rod.

4 Claims, 4 Drawing Sheets

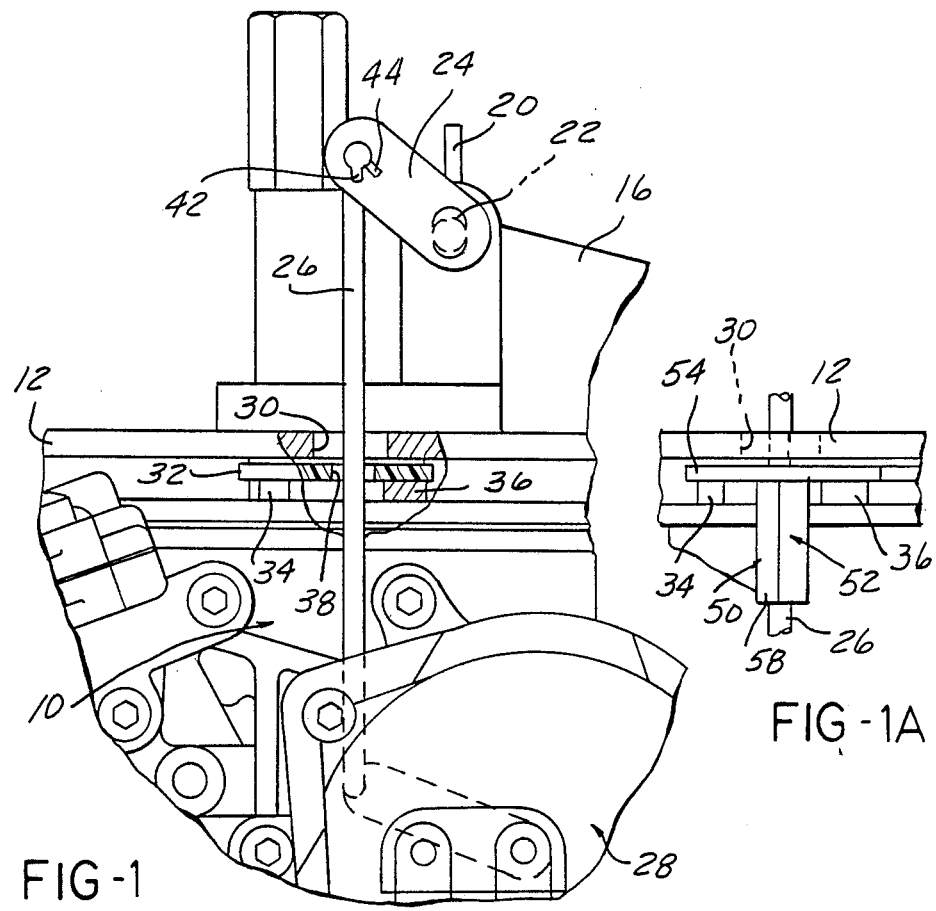
FIG-1
PRIOR ART
FIG-1A
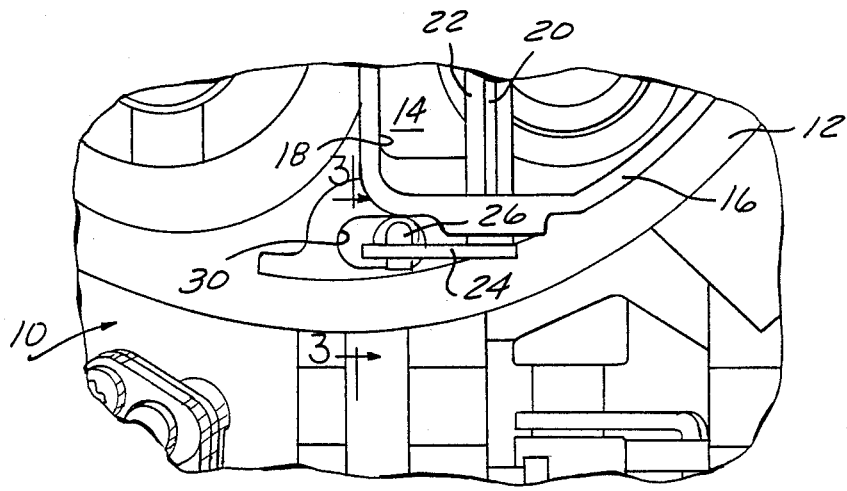
FIG-2
PRIOR ART

MULTI PLANE ARTICULATING ROD SEAL

BACKGROUND OF THE INVENTION

The present invention is directed to a rod seal for sealing an actuating rod to a housing wall through which the rod passes in applications where the rod must be capable of movement relative to the housing in two or more mutually perpendicular directions.

A primary example of a rod seal having the foregoing requirements is that of the choke actuating rod of a carburetor for an internal combustion engine. The carburetor body is formed at its upper end with an annular radially outwardly projecting flange which surrounds the induction air passages which open at the top of the carburetor body. The upper surface of this annular flange serves as an annular seat for the air cleaner which filters dirt particles from outside air drawn into the induction air passages by the manifold vacuum during operation of the engine. When the air cleaner is mounted upon the annular flange, it defines a closed chamber at the top of the carburetor body whose only inlet is through the filter of the air cleaner. A choke plate is mounted within this chamber at the inlet of one or more of the induction air passages for pivotal movement in a well known manner to adjustably control the flow of air into the passages to provide an enriched fuel mixture to the engine during cold start and warm up. The rotatable shaft of the choke plate is normally located above the annular sealing flange and provided with a crank arm at one end which is coupled to one end of the choke actuating rod, the other end of the rod being coupled to an automatic choke mechanism mounted on the exterior of the carburetor body. Because the choke plate carrying shaft is located above the annular sealing flange which supports the air cleaner, the choke rod-crank shaft connection must be located within the closed clean air chamber established by the air cleaner when mounted on the carburetor. A hole must be provided through the annular flange to permit the actuating rod to pass through the flange from the externally mounted actuating member into the clean air chamber. While the main component of motion of the rod in actuating movement is longitudinally of the rod, the rod must also move laterally because of the circular path of the end of the crank arm to which it is connected within the chamber. This requires the hole through the flange to be substantially larger than the rod, and this enlarged opening provides a substantially unrestricted flow path for the flow of uncleaned outside air into the clean air chamber induced by the sub atmospheric (manifold vacuum) pressure within the clean air chamber.

The conventional arrangement for sealing this opening is only partially effective. A generally rectangular slider plate of dimensions larger than the hole in the annular sealing flange is mounted for sliding movement in substantial engagement with the external surface of the sealing flange through which the rod projects. The slider plate is formed with an opening through which the actuating rod extends. This arrangement only partially seals the opening because the opening through the slider plate must be substantially larger than the diameter of the rod to accommodate insertion of a key like "dog ear" formed at the end of the actuating rod which passes through a key hole shaped opening in the choke plate crank to retain the actuating rod coupled to the crank. This enlarged opening in the plate and the clearance between the slider plate and sealing flange provide two paths for the flow of unclean outside air to the clean air chamber. While that path between the slider plate and sealing flange surface can be minimized by minimizing the clearance between these two members, in order to provide for insertion of the "dog ear" key on the rod through the bore in the slider plate, the diameter of this bore must be at least twice that of the rod diameter.

The present invention is directed to a seal which eliminates this latter problem.

SUMMARY OF INVENTION

In accordance with the present invention, a choke actuating rod seal includes a slider plate integrally formed with an elongate leg portion which projects perpendicularly from the side of the slider plate remote from the annular sealing flange of the carburetor housing. The leg is of generally semi cylindrical configuration. A mating semi cylindrical closure member is assembled to the leg portion by a snap fit arrangement to form with the leg portion a cylindrical tube extending perpendicularly from one side of the slider plate. The leg portion and the closure member are formed on their opposed surfaces with concave grooves which, when the leg portion and closure member are assembled, define a passage way extending coaxially from the bore through the slider plate to the opposite end of the projection. The internal diameter of this passage is such as to slidably receive the choke actuator rod.

The rod is assembled into the improved seal before the closure member is assembled to the leg portion. After the dog eared end of the rod has been passed through the bore in the slider plate from the leg portion side, the rod is seated in the groove in the leg portion and the closure member snap fitted in place. The passage through the assembled leg portion and closure member is only slightly larger than the rod diameter, thus a loose sliding seal extending over a fairly substantial axial portion of the rod is provided so that leakage through this passage is minimized.

Further objects and features of the invention will become apparent by reference to the following specification and to the drawings.

IN THE DRAWINGS:

FIG. 1 is a side elevational view of a carburetor employing a conventional prior art choke rod seal, with certain parts broken away, shown in section, or omitted;

FIG. 1a is a side elevational view of a portion of the carburetor as shown in FIG. 1 with a choke rod seal according to the present invention;

FIG. 2 is a top plan view of a portion of a carburetor showing the opening through which the choke actuator rod projects;

Figure 3:
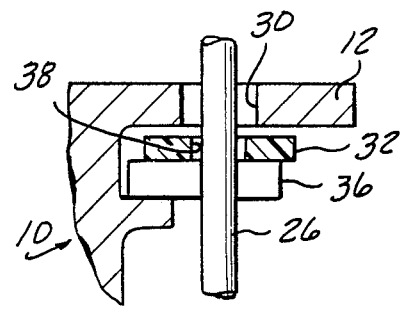
FIG. 3 is a cross sectional view taken on line 3—3 of FIG. 2, showing the prior art rod seal of FIG. 1.

In FIGS. 1-3, there are shown portions of a conventional carburetor which employs a prior art choke rod seal, these figures illustrating the problem to which the present invention is addressed. A carburetor body designated generally 10 is formed with a radially outwardly projecting annular flange 12 which functions as a seat for a conventional air cleaner, not shown, which when seated upon the flange 12 sealingly encloses and defines an inlet chamber from which air can flow into various air passages, such as 14 (FIG. 2) which extend downwardly through the carburetor body to communicate in a well known manner with the intake manifold of the engine (not shown). Outside air is drawn into and through the carburetor air passages by the manifold vacuum during operation of the engine, and the air cleaner functions, in a well known manner, to filter dirt particles from the outside air before the air enters the carburetor passages.

The passages 14 (FIG. 2) of the carburetor extends downwardly through the air horn 16 which projects upwardly above flange 12 at a location spaced radially inwardly of the flange periphery to accomodate mounting of the air cleaner so that the inlet opening 18 (FIG. 2) of the air horn is within the clean air or inlet chamber established by the air cleaner when operatively mounted upon the carburetor.

At the upper end of air horn 16, a choke plate 20 is mounted upon a shaft 22 for pivotal movement in a well known manner at the inlet of passage 14. In FIGS. 1 and 2, the choke plate 20 is shown in its fully opened position in which the choke plate imposes a minimum restriction to flow of air downwardly into passage 14. To pivot the choke plate as maybe required to enrich the fuel-air mixture, a crank arm 24 is rotatively locked to a projecting end of the choke shaft 22 and the distal end of the crank arm 24 is coupled by a choke actuating rod 26 to an automatic choke mechanism designated generally 28 which is mounted at the exterior of carburetor body 10 below flange 12. Mechanism 28 is of well known and conventional construction and functions to reciprocate actuating rod 26 as viewed in FIG. 1 to drive crank 24 in rotation about the axis of shaft 22 to angularly position choke plate 20.

Because the crank 24 is located within the clean air chamber established by the air cleaner and the automatic choke 28 is located at the exterior of the carburetor body, the choke actuator rod 26 must pass an opening 30 in flange 12 to accommodate installation and removal of the air cleaner without requiring disassembly of the mechanical connection between automatic choke 28 and crank 24. Opening 30 must be of a size sufficient to afford a substantial clearance for actuating rod 26 because, as best seen in FIG. 1, rotation of crank 24 will require lateral displacement of rod 26 from right to left as viewed in FIG. 1, and engine vibration will induce lateral vibratory movement of the elongate rod 26. The relatively large opening 30 required to accommodate this lateral movement of the rod thus constitutes a relatively large passage for the flow of unfiltered outside air into the clean air space above flange 12.

A prior art seal for sealing opening 30 is disclosed in FIGS. 1 and 3. This prior art seal takes the form of a flat generally rectangular slider plate 32 whose length and width substantially exceed the corresponding dimensions of opening 30. Plate 32 is supported immediately beneath the lower surfaces of sealing flange 12 in underlying relationship with opening 30 by a pair of arms 34, 36 and actuating rod 26 passes through a central opening or bore 38 through plate 32. However, the opening 38 through plate 32 which receives actuating rod 26 must be of an internal diameter which is substantially greater than the diameter of rod 26 to enable plate 32 to be assembled on the rod.

Figure 4:
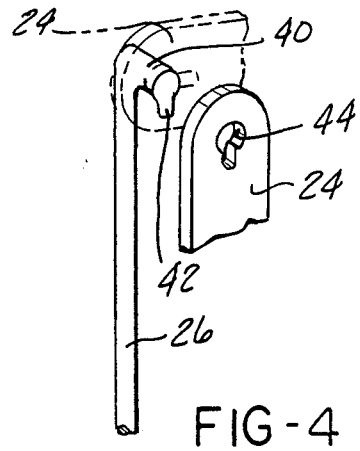
FIG. 4 is a perspective view showing portions of the choke actuator rod and choke plate crank.

Referring to FIG. 4, the upper end of actuating rod 26 is bent at a right angle as at 40 to form a pivot shaft accommodating relative pivotal movement between rod 26 and crank 24 when the rod and crank are assembled to each other. To prevent axial withdrawal of the shaft portion 40 from the crank, a key like radial projection referred to as a dog ear 42 is formed at the free end of the pivot shaft portion 40 of rod 26 and the crank arm 24 is formed with a key hole like opening 44 through which the dog ear 42 of shaft 40 may be passed when the rod 26 and crank arm 24 are properly aligned with each other. Once the dog-eared end of rod portion 40 has been passed entirely through the key hole opening 44 in crank 24, and the rod pivoted relative to the crank about the axis of portion 40 of the rod, the crank arm is positively trapped against axial separation from portion 40 by dog ear 42 (see FIG. 1). The orientation of the key hole 44 in crank arm 20 is such that the dog ear 42 does not become aligned with key hole 44 over the normal range of movement of the rod and crank. A similar arrangement is employed to couple the opposite end of rod 26 to the automatic choke 28.

In order to assemble slider plate 32 upon the actuating rod 26, it is thus necessary that dog ear 42 be passed through bore 38 in the slider plate. In order to accommodate this passage of the dog ear, bore 38 must be of a diameter which exceeds that of the rod 26 by at least the amount by which dog ear 42 radially projects from pivot shaft portion 40.

Thus, when the rod and seal are assembled there remains a substantial opening directly through the seal constituted by the slider plate 32. Effectively, the slider plate 32 reduces the cross sectional area of flow passage upwardly through opening 30, but does not entirely seal this passage. While some clearance exists between the lower surface of flange 12 and the upper surface of slider plate 32, this clearance is relatively small and of a vertical width such that it would itself filter out larger dirt particles. The required enlargement of bore 38 relative to the actuating rod diameter, on the other hand, accommodates a relatively large flow of dirt carrying outside air into the carburetor induced by manifold vacuum within the carburetor.

A seal according to the present invention substantially completely eliminates this problem. A seal according to the present invention is assembled from two elements, namely, a plate member designated generally 50 and a closure member designated generally 52, which may be assembled to each other by a snap fit assembly arrangement.

Plate member 50 is shown per se in FIGS. 5-9 of the drawings and is a one piece member of a suitable thermoplastic drawings and is a one piece member of a suitable thermoplastic material. Plate member 50 includes a generally rectangular flat plate portion 54 of dimensions similar to those of the prior art slider plate 32 described above and is intended to be mounted on the carburetor in the same fashion as was slider plate 32. (Compare FIG. 1 with FIG. 1a). The plate may be formed with grooves such as 55 (FIG. 5) to enable corners of the plate to be snapped off as may be required to provide clearance for certain models of carburetors. A bore 56 extends downwardly through plate portion 54, and an elongate leg portion 58 is formed integrally with plate portion 54 and projects perpendicularly downwardly from a lower side of the plate portion. As best seen in the bottom view of FIG. 7, leg portion 58 is of a generally semi cylindrical configuration and is formed with a concave recess 60 on its inner side which defines a downward extension of the lower portion of bore 56. Along each side of the concave bore extension 60, recesses 62 extend for the entire length of the leg portion 58 and two or more undercut inwardly inclined teeth 64 project inwardly from the radially outer wall of each recess 62.

Figure 8:
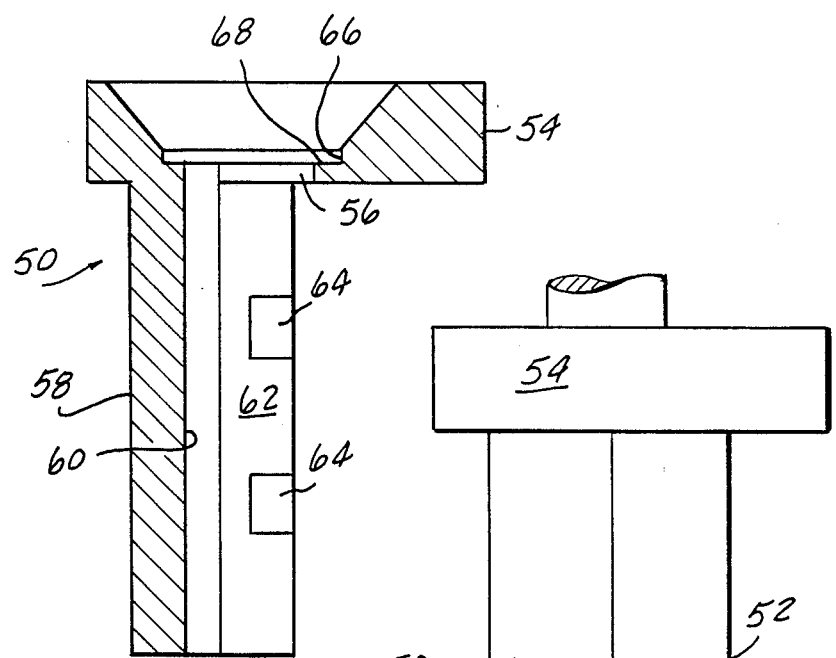
FIG. 8 is a cross sectional view taken on the line 8—8 of FIG. 6.

An enlarged diameter counter bore 66, best seen in FIG. 8, at the upper end of bore 56 forms a relatively thin radially inwardly projecting shoulder extending circumferentially around that portion of bore 56 not extended by the concave recess 60.

Figure 10:
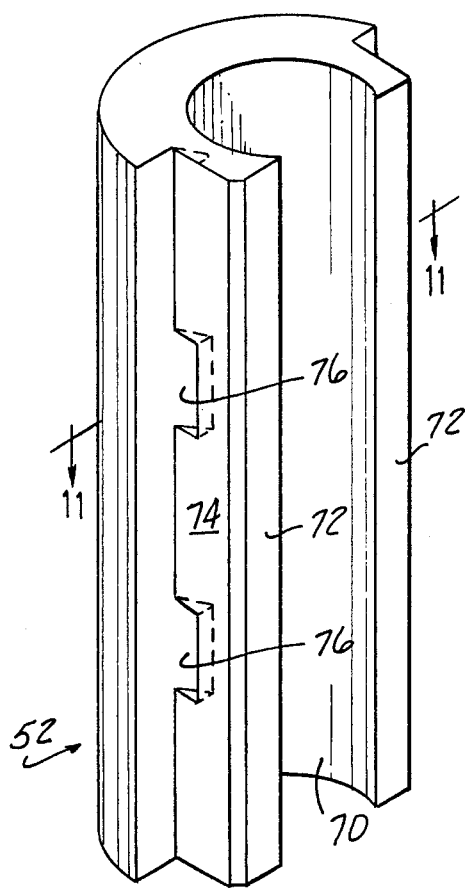
FIG. 10 is a perspective view of a closure member of the seal of the present invention.
Figure 11:
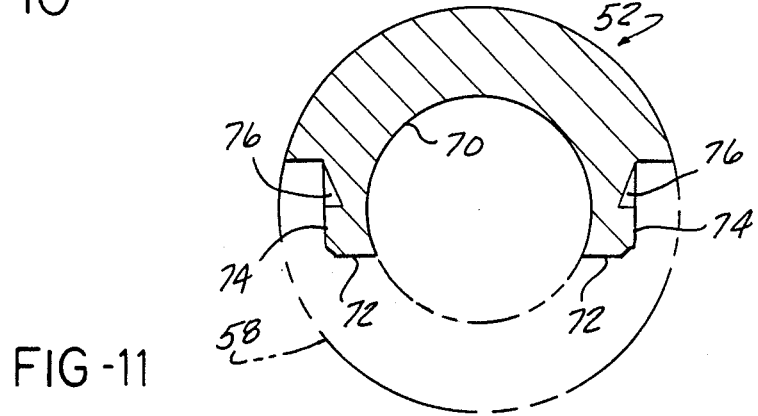
FIG. 11 is a cross sectional view of the closure member of FIG. 10 taken on the line 11—11 of FIG. 10.
Figure 5:
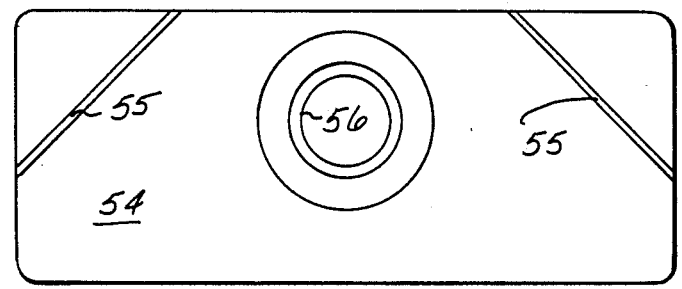
FIG. 5 is a top plan view of one element of a seal embodying the present invention.
Figure 6:
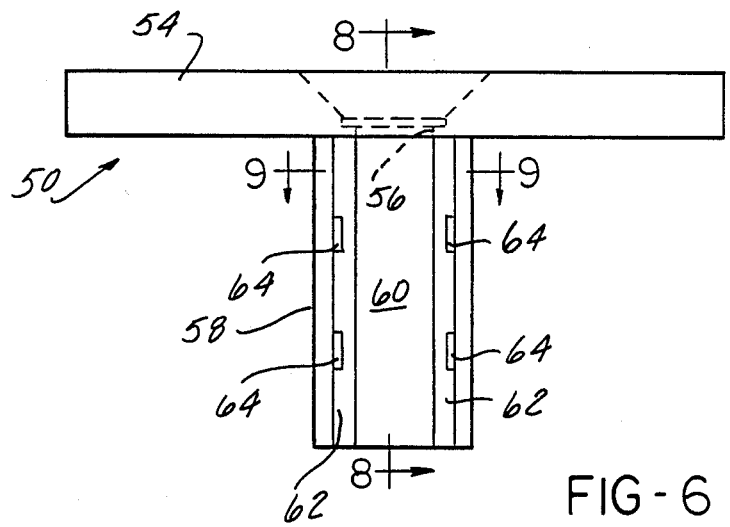
FIG. 6 is a side elevational view of the structure of FIG. 5.
Figure 7:
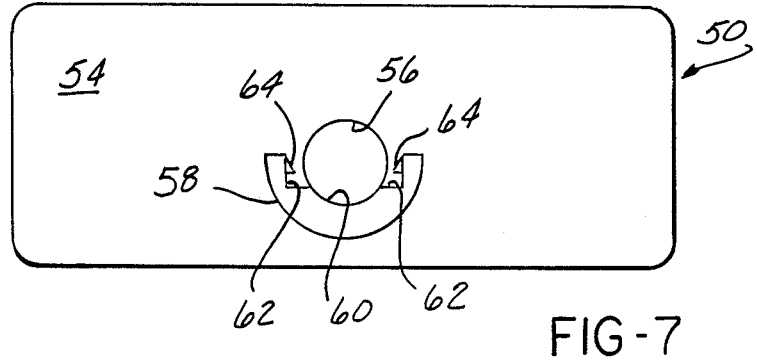
FIG. 7 is a bottom view of the structure of FIG. 5.

Closure member 52, FIGS. 10 and 11, is of a generally semi-cylindrical configuration and is formed at its radially inner side with a concave recess 70. Along opposite sides of recess 70, surfaces 72, 74 are formed and dimensioned to be received within the recesses 62 of leg portion 58 of plate member 50. Undercut recesses 76 are formed in the surfaces 74 and are dimensioned and conformed to receive the teeth 64 on leg portion 58 so that closure member 52 may be snap fitted into assembled relationship with the leg portion, as in FIGS. 1A and 12. When so assembled, the opposed concave recesses 60 of leg portion 58 and 70 of closure member 52 cooperatively define an extension of bore 56 which is of a diameter such as to closely and slidably receive choke actuator rod 26.

Because of the manner in which the choke rod is assembled to the seal of the present invention, the diameter of the small diameter bore 56 through the plate portion 54 of plate member 50 and the diameter of the bore extension defined by the concave grooves 60 and 70 of the leg portion 58 and closure member 52 respectively need be larger than the diameter of choke actuating rod 26 only by the amount necessary to accommodate free sliding movement of the rod through these bores.

To assemble the choke actuator rod to the improved seal, the dog eared end of rod 26 is assembled to plate member 50 before plate member 50 is assembled to closure member 52. The dog eared end of rod 26 is forced upwardly through bore 56 with the dog ear 42 being forced past the relatively thin web 68 (FIG. 8) defined by the enlarged counter bore 66. The web 68 is thin enough to be deflected by the dog ear, and even if the dog ear gouges or permanently deforms the web as it is forced through, no great harm is done because the subsequent assembly of closure member 52 to plate member 54 will substantially seal the upper end of closure member 52 to the lower surface of plate portion 54 of the plate member.

After the dog eared end actuator rod 26 has been passed upwardly through bore 56, it is moved upwardly above the top of plate portion 54 and the rod 26 is then seated in groove 60. Closure member 52 is then forced into a snap fitted engagement with leg portion 58 in which the teeth 64 on leg portion 58 snap into the recesses 76 of closure member 52 to complete the assembly of the seal on rod 26.

Figure 12:
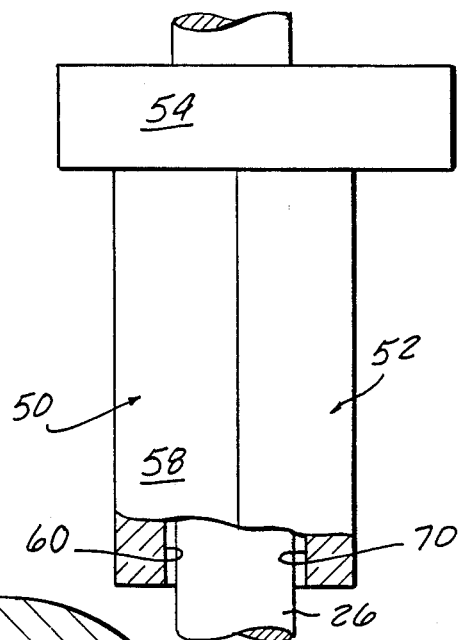
FIG. 12 is a side elevational view of an assembled seal embodying the present invention showing portions of a choke actuator rod received in the seal.
Figure 9:
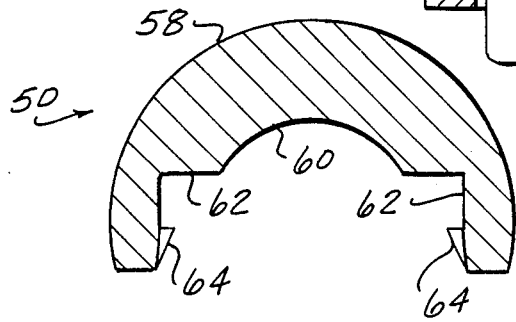
FIG. 9 is a cross sectional view taken on the line 9—9 of FIG. 6.

When the assembly is completed, as best seen in the broken away portion of FIG. 12, the bore defined by grooves 60 and 70 has only a slight clearance from rod 26, the amount of clearance required being only enough to permit relatively free sliding movement of rod 26 relative to the seal. Further, the "passage" defined by this relatively small clearance is of substantial length, and thus flow of air through this relatively restricted passage is negligible as compared to that possible with the prior art slider plate 32.

While one embodiment of the invention has been described in detail, it will be apparent to those skilled in the art that the disclosed embodiment may be modified and that application of the invention is not restricted to the specific carburetor application described. Therefore, the foregoing description is to be considered exemplary rather than limiting, and the true scope of the invention is that defined in the following claims:

I claim:

1. A seal for sealing an elongate rod having an enlargement at one end to a housing wall lying in a general plane substantially normal to the longitudinal axis of the rod, said wall having an opening through which said rod projects, said opening freely accommodating both reciprocation of said rod relative to said housing along the rod axis and lateral movement of said rod relative to said housing in directions normal to its axis; said seal comprising a flat plate having one side surface adapted to slidably engage said housing wall in overlying relationship to said opening, said plate having a rod receiving bore therethrough adapted to accommodate the passage of said enlargement therethrough, an elongate leg portion projecting perpendicularly from the other side surface of said plate at one side of said rod receiving bore and having elongate concave groove extending from said bore the entire length of said leg portion, an elongate closure member having a elongate concave groove extending its entire length, cooperating snap fit coupling means on said leg portion and closure member for fixedly assembling said leg portion and closure member to each other with one end of said closure member engaged within said other side surface of said plate and the concave grooves in said leg portion and said closure member defining a rod receiving passage extending from said rod receiving bore in said plate to the remote end of said leg portion, said passage slidably receiving said rod.

2. The invention defined in claim 1 wherein said bore includes a first section extending into said plate from said one surface to a radially inwardly projecting shoulder, and a reduced diameter section extending coaxially of said first section of said bore from said shoulder to said other surface, said leg portion being integral with said plate and extending around a first portion of the circumference of said second section of said bore at said other surface, said shoulder defining with said other surface a relatively thin web extending around the remainder of the circumference of said second section of said bore and capable of flexing to accommodate the passage of said enlargement of said rod, said second section of said bore and the passage defined by said concave grooves in said leg portion and closure member when assembled being of a diameter slightly exceeding that of said rod, and said first section of said bore being of a diameter at least equal to the maximum dimension of said enlargement.

3. The invention defined in claim 2 wherein said leg portion has opposed elongate recesses at the inner side of said member extending along opposite sides of said groove in said leg portion whereby the last mentioned groove constitutes a minor portion of the circumference of said passage.

4. The invention defined in claim 1 wherein said snap fit coupling means comprises an elongate recess in said leg portion extending along the inner side of said leg portion at each side of the concave groove therein, radially inwardly inclined undercut teeth in said recess at opposite sides of said groove in said leg portion, elongate projections on said closure member complementary in shape to said recesses in said leg portions and receivable therein, and undercut recesses in said projections of said closure member adapted to interlock with said teeth when said projections of said closure member are seated in said recesses in said leg portion.

* * * * *